United States Patent Office 3,220,527
Patented Nov. 30, 1965

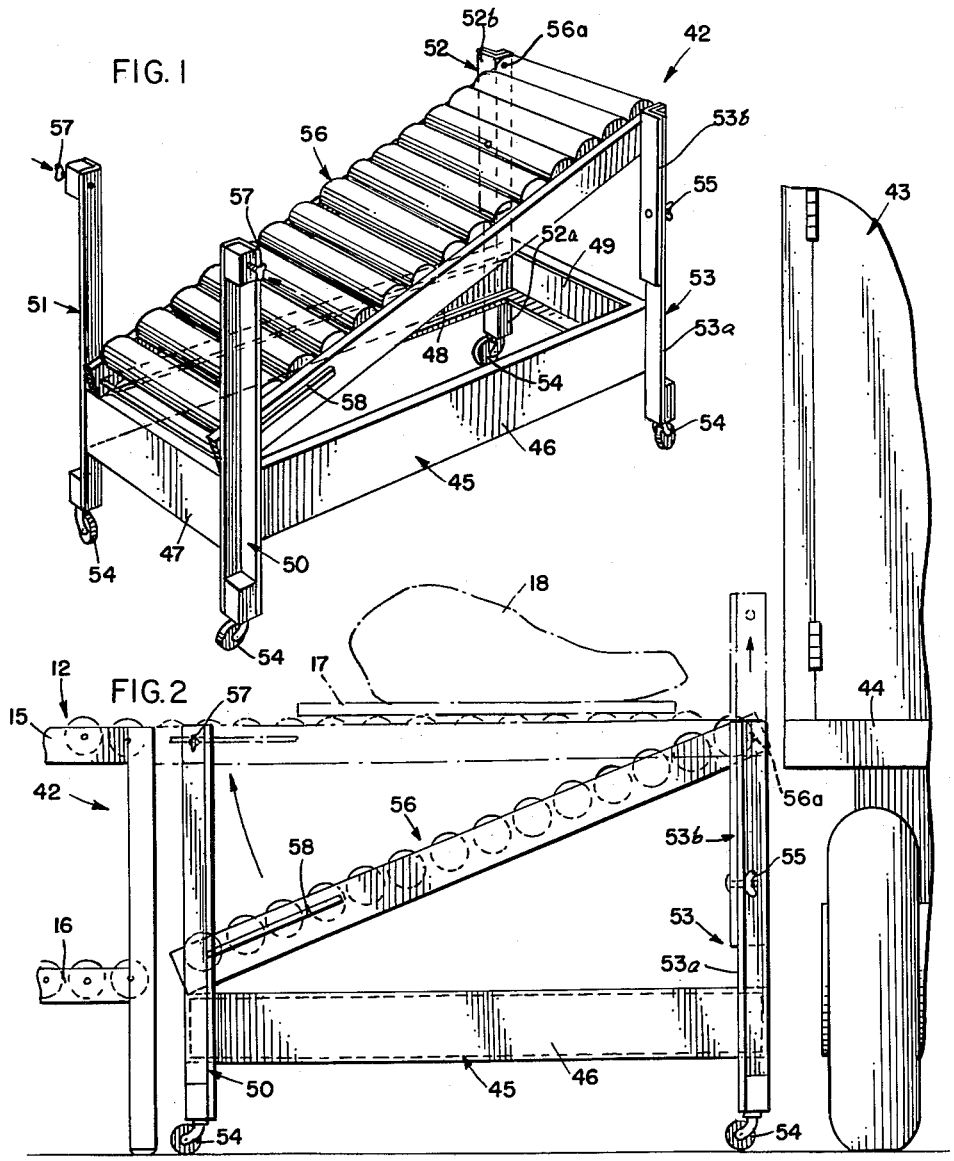

3,220,527
PORTABLE ROLLER CONVEYOR FOR
HANDLING MEAT PRODUCTS
Glenn R. Curtis, Evanston, Ill., assignor to Independent Grocers' Alliance Distributing Co., Chicago, Ill., a corporation of Illinois
Original application Mar. 13, 1961, Ser. No. 95,178, now Patent No. 3,140,510, dated July 14, 1964. Divided and this application July 10, 1964, Ser. No. 381,685
1 Claim. (Cl. 193—35)

This case is a division of Serial No. 95,178 filed March 13, 1961, now Patent No. 3,140,510, issued July 14, 1964.

This invention relates to apparatus for handling meat products, and more particularly to apparatus especially useful in receiving meat deliveries at a retail store.

Heretofore, meat handling procedures have depended upon the arrangement of equipment and facilities for handling meat and have been time-consuming, costly and inefficient. An example of a common accepted meat handling procedure includes the necessity of the delivery man to climb from ground level into a refrigerated meat truck and then gathering of the items to be delivered on the rear end of the truck so that they can be reached when he descends to the ground. It is well known that beef is difficult to handle due to its awkward shape and its weight, but for convenience of handling the beef carcass is usually cut into quarters which usually weigh between one hundred twenty five to two hundred pounds. Upon descending to the ground, the delivery man must load the quarter of beef on his shoulder and carry it into a store through a door that is usually not more than thirty six inches wide.

The present invention overcomes the difficulties heretofore encountered in the handling of meat products, and permits a more efficient and economical manner of handling meat at a retail store.

It is therefore an object of this invention to provide a new and improved apparatus for handling meat products more quickly and efficiently.

Another object of this invention is in the provision of apparatus for receiving meat deliveries in a retail store wherein the meat handling and receiving time is materially reduced, thereby reducing the labor involved in handling of the meat.

Other objects, features and advantages of the invention will be apparent from the following detailed disclosure, taken in conjunction with the accompanying sheets of drawings, wherein like reference numerals refer to like parts, in which:

FIG. 1 is a perspective view of a portable roller conveyor section adapted for use in bridging the gap between the truck and a conveyor in the meat handling room for facilitating the unloading of meat from the truck; and FIG. 2 is a side elevational view of the portable conveyor section of FIG. 1 showing it in position between a truck and the conveyor in the meat handling room, and showing in phantom the second position for the roller section.

Although the present invention is illustrated and will be described as most generally applicable for use in the receiving and handling of meat products at a retail store, it should be appreciated that other uses and purposes of the invention will be apparent to one skilled in the art. However, the present invention is largely useful in connection with receiving shipments of meat products as unloaded from a refrigerated meat truck, wherein it is desired to weigh the meat products, divide them into primal cuts where desired, and to transport same into a meat storage cooler.

Referring now to the drawings, a building such as a retail store would be provided with a meat handling room and a meat cooler (not shown) and a conveyor 12 of any desirable type.

The conveyor 12 extends generally from an inlet or opening in the meat handling room providing access to the outer loading and unloading area of the store through the meat handling room and into the meat cooler. The conveyor 12 is preferably of a standard well known type and especially a roller conveyor wherein the rollers are mounted adjacent and parallel to one another between opposed frame flanges, and are preferably idly supported. In this instance it is generally necessary to provide some external power for moving items therealong, and in this case the power may be that of an operator wherein the control of movement of the items may be closely guarded. However, a slight grade may be applied to the conveyor between the opening in the meat handling room and the opening in the meat cooler to provide a gravity feed of the items thereon in the direction of the meat cooler. Thus, the sections of the roller conveyor at the opening to the meat handling room would be slightly higher than at the opening to the meat cooler. Moreover, the conveyor 12 may include an upper run 15 and a lower run 16 wherein it may be desired to send meat products and items of one type along the upper run and meat products and items of another type along the lower run. Particularly, quarters of beef could be advanced along the upper run while meat products and the like packaged in containers may be advanced along the lower run and directly into the meat cooler. But the meat products advanced along the upper run could be weighed and further cut into smaller pieces if so desired. Both runs may be graded to provide gravity feed of the meat products in the direction of the meat cooler.

In order to facilitate the handling of basic meat units such as quarters of beef and the like, pallets or skids may be provided to support the meat on the conveyor.

In order to facilitate the transfer of the meat products from a transporting vehicle to the conveyor 12 at the loading entrance to the meat handling room, a portable roller conveyor section 42, FIGS. 1 and 2, may be used. As would normally be the case, a refrigerated truck 43 would enter an unloading dock or area outside of the store adjacent to the loading entrance of the meat handling room. Normally a door would close the entrance and the inlet end of the conveyor 12 from the unloading area. The truck 43 would align its unloading platform 44 or unloading door of the truck adjacent to the loading entrance. The portable conveyor section 42 would be aligned therewith such as illustrated in FIG. 2, whereupon pallets would be provided the truck driver for loading the basic meat units unto the portable conveyor section and for subsequent transfer to the conveyor 12. The portable conveyor section includes a rectangular frame 45 having rectangularly connected sections 46, 47, 48 and 49. At each corner of the frame, an upstanding leg is provided as designated by the numerals 50, 51, 52 and 53. At the lower end of each leg, a caster 54 is provided to facilitate movement of the conveyor section along its supporting surface.

The legs 52 and 53 include lower sections 52a and 53a rigidly secured to the rectangular frame 45 and upper movable and adjustable sections 52b and 53b that may be suitably adjustably secured to the lower sections by means of nut and bolt units 55, wherein a slot being provided in the fixed sections 52a and 53a would permit vertical adjustment of the sections 52b and 53b. Adjacent the upper opposite ends of the sections 52b and 53b, there is provided pins 56a for pivotally mounting one end of a roller conveyor section 56. It is this end which would be placed adjacent to and at the same height as the unloading platform of a refrigerated truck. The other end of the roller conveyor section 56 may attain one of two positions, that of resting on the rectangular frame 45 as shown in FIGS. 1 and 2 or that of being secured in an upper position by pins 57 engaging under-livered from the truck to the lower run 16 of the conveyor section 56. The roller conveyor section is shown in its upper position in dotted lines in FIG. 2. When the roller conveyor section 56 is in the lower position and resting on the frame 45, meat products may be delivered from the truck to the lower run 16 of the conveyor 12. While when the conveyor section 56 is in its upper position, meat products may be delivered to the upper run 15 of the conveyor 12. The positioning of the rectangular frame 45 relative to the legs is such as to permit alignment with the outlet end of the conveyor section 56 and the inlet end of the lower run 16 of the conveyor 12, while the securing of the conveyor section 56 in the upper position is such as to align the outlet end of the conveyor section with the inlet end of the upper run 15 of the conveyor 12.

From the foregoing, it is seen that the present invention provides improved apparatus for handling meat deliveries at a retail store which will reduce the manpower and handling of meat products and ultimately the cost of operating the store.

It will be understood that modifications and variations may be effected without departing from the scope of the novel concepts of the present invention, but it is understood that this application is to be limited only by the scope of the appended claim.

The invention is hereby claimed as follows:

A portable roller conveyor comprising a rectangular frame having upstanding legs secured at each corner thereof and projecting above and below thereof, a caster at the bottom end of each leg, the legs at one end including stationary parts secured to the frame and movable parts adjustably secured to said stationary parts above said frame, a section of rollers having inlet and outlet ends, means for pivotally securing the inlet end of said section to the movable parts of the legs at one end of said frame, means selectively positioning the outlet end of the section along the legs above the frame in upper or lower positions including locking means for securing the section in the upper position while the section rests on the frame in the lower position.

References Cited by the Examiner
UNITED STATES PATENTS

| | | | |
|---|---|---|---|
| 1,050,478 | 1/1913 | Lister et al. | 193—36 |
| 2,199,097 | 4/1940 | Chappelle | 193—35 |
| 3,059,747 | 10/1963 | Sullivan | 193—35 |

SAMUEL F. COLEMAN, *Primary Examiner.*